(12) United States Patent
Dristy

(10) Patent No.: US 6,368,740 B1
(45) Date of Patent: Apr. 9, 2002

(54) ELECTROCHEMICAL CELL FRAME HAVING INTEGRAL PROTECTOR PORTION

(75) Inventor: Mark E. Dristy, Manchester, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 0 days.

(21) Appl. No.: 09/465,104

(22) Filed: Dec. 16, 1999

Related U.S. Application Data

(60) Provisional application No. 60/114,020, filed on Dec. 29, 1998.

(51) Int. Cl.$^7$ ................................................ H01M 8/02
(52) U.S. Cl. .......................................... 429/35; 429/39
(58) Field of Search .............................. 429/35, 38, 39

(56) References Cited

U.S. PATENT DOCUMENTS

| | | | | |
|---|---|---|---|---|
| 3,126,302 A | * | 3/1964 | Drushella | 429/38 |
| 3,278,336 A | * | 10/1966 | Uline et al. | 429/35 |
| 3,436,272 A | * | 4/1969 | Gelting | 429/39 |
| 4,317,864 A | * | 3/1982 | Strasser | 429/38 X |
| 6,057,054 A | * | 5/2000 | Barton et al. | 429/35 X |
| 6,099,716 A | | 8/2000 | Molter et al. | 205/687 |
| 6,117,287 A | | 9/2000 | Molter et al. | 204/255 |

FOREIGN PATENT DOCUMENTS

| WO | WO 98/1389 | 4/1998 |
|---|---|---|
| WO | WO 98/40537 | 9/1998 |
| WO | WO 99/61684 | 12/1999 |

* cited by examiner

*Primary Examiner*—Stephen Kalafut
(74) *Attorney, Agent, or Firm*—Cantor Colburn LLP

(57) ABSTRACT

The unique cell frame of the present invention comprises an integral protector portion. This protector portion comprises a rigid or flexible lip on the membrane side of the cell frame. In an assembled cell stack, the membrane assembly is disposed between two cell frames on the side of the cell frames having the protector portion. Screen assemblies are disposed on the opposite side of the cell frame such that the screen assemblies rest on the protector portion, within the cell frame. The protector portion prevents the edge of the screen assemblies from pinching, cutting, or otherwise damaging the membrane.

10 Claims, 2 Drawing Sheets

ELECTROCHEMICAL CELL FRAME HAVING INTEGRAL PROTECTOR PORTION

CROSS REFERENCE TO RELATED APPLICATIONS

This application claims the benefit of the filing date of U.S. Provisional Application Serial No. 60/114,020, filed Dec. 29, 1998, the entire contents of which is hereby incorporated by reference.

TECHNICAL FIELD

This invention relates to electrochemical cell frames, and especially relates to an electrochemical cell frame having an integral protector portion.

BACKGROUND OF THE INVENTION

Electrochemical cells are energy conversion devices, usually classified as either electrolysis cells, fuel cells or batteries. The typical proton exchange membrane electrochemical cell stack includes a number of individual cells arranged in a stack with fluid (typically water) flowing therein. The fluid is typically forced through the cells at high pressures.

The cells within the stack are sequentially arranged and include an anode, a proton exchange membrane, and a cathode. The anode/membrane/cathode assemblies are supported on either side by layers of screen or expanded metal, which are in turn surrounded by cell frames and separator plates to form reaction chambers and to seal fluids therein. The cell frames are typically held together in the stack by tie rods passing through the frames and separator plates. End plates are mounted to the outside of the stack, and, together with the cell frames and tie rods, function to counteract the pressure of the fluids operating within the stack.

The frames include ports to communicate fluids from a source to the individual cells and also include additional ports to remove the fluids from the cells. Screens are used to establish flow fields within the reaction chambers. The flow fields facilitate fluid transport, maintain membrane hydration, provide mechanical support for the membrane, and provide a means for transferring electrons to and from electrodes.

A proton exchange membrane electrolysis cell, for example, functions as a hydrogen generator by electrolytically decomposing water to produce hydrogen and oxygen gas. Referring to FIG. 1, in a typical single anode feed water electrolysis cell 101, process water 102 is reacted at oxygen electrode (anode) 103 to form oxygen gas 104, electrons, and hydrogen ions or protons 105. A portion of the process water containing some dissolved oxygen gas 102', and oxygen gas 104, exit the cell. The protons 105 migrate across a proton exchange membrane 108 to a hydrogen electrode (cathode) 107, where the protons 105 react with the electrons, which have migrated through the electrical load 106, to form hydrogen gas 109. The hydrogen gas 109 and the water 102" that has been drawn across the membrane 108 by the protons (hydronium ions), exit from the cell through manifolds in the cell stack. Reactions for a typical electrolysis cell are as follows:

Anode: $2H_2O \rightarrow 4H^+ + 4e^- + O_2$

Cathode: $4H^+ + 4e^- \rightarrow 2H_2$

A typical fuel cell operates in the reverse manner as that described herein above for electrolysis cells. In a fuel cell, hydrogen, methanol, or other hydrogen fuel source combines with oxygen, via the assistance of a proton exchange membrane, to produce electric power. Reactions for a typical fuel cell are as follows:

Anode: $2H_2 \rightarrow 4H^+ + 4e^-$

Cathode: $4H^+ + 4e^- + O_2 \rightarrow 2H_2O$

The cell frames that surround each of the cells within a stack typically contain multiple ports for the passage of reactant fluids. These ports are usually sealed by means of sealing ridges, which are embossed, machined, or molded into the frame. The sealing features react against gaskets included in the stack to maintain fluid tight joints and also grip the gaskets to prevent creep and extrusion of the membrane. As is well-known in the art and discussed in U.S. Pat. No. 5,441,621 to Molter et al., a common method of sealing utilizes ridges in concentric patterns around the ports, with separate concentric patterns around the sealing area of the cell frame.

A common method for providing a fluid communication pathway between the reservoir, or active area, of a cell and the individual fluid ports in the frame comprises manifolds machined into the frame. The manifolds typically comprise holes machined in the edge of the cell frames orthogonal to the ports. Fluids, after passing through the inlet ports and the holes in the manifolds, enter the screen packs, electrodes, and membrane. The fluids and gas products similarly exit through outlet manifolds and sealed outlet ports to collection tanks.

Existing cell frames have a number of drawbacks and disadvantages. For example, current technology uses protector rings to bridge the gap between the cell frame and the screen packs. The protector rings, which are typically positioned about the perimeter of the frame, function to prevent membrane extrusion and "pinching" between the frame and the screen. Although these protector rings function well in operation, they render assembly of the cell very difficult, often breaking loose, which results in misalignment and possible damage to the membrane. Specifically, because of their small cross-section, the protector rings tend to slide out of position and, as a result, often do not cover the gap between the frame and the screen that they are designed to bridge.

Accordingly, there remains a need in the art for electrochemical cell frames that enable simplified assembly and manufacture, and offer a smooth interface with the membrane.

SUMMARY OF THE INVENTION

The present invention relates to an electrochemical cell frame and to an electrochemical cell stack. The electrochemical cell frame comprises: fluid transportation conduits; and an integral protector portion having an extension protruding from the membrane side of the frame.

The electrochemical cell stack comprises: a membrane disposed between an anode electrode and a cathode electrode to form a membrane assembly; at least two screen assemblies; and at least two cell frames, each cell frame having a membrane side and a screen assembly side, and at least one of said frames having an integral protector portion with an extension protruding from the membrane side of the frame; wherein the membrane assembly is disposed between the cell frames, in intimate contact with the membrane side of the cell frames, and one of the screen assemblies is disposed on each of the screen assembly sides of said cell frames, in intimate contact with both of the integral protector portion and the membrane assembly.

The above discussed and other features and advantages of the present invention will be appreciated and understood by those skilled in the art from the following detailed description and drawings.

BRIEF DESCRIPTION OF THE DRAWINGS

Referring to the drawings, which are meant to be exemplary, not limiting, and wherein like elements are numbered alike in the several Figures.

BEST MODE FOR CARRYING OUT THE INVENTION

Figure 1:
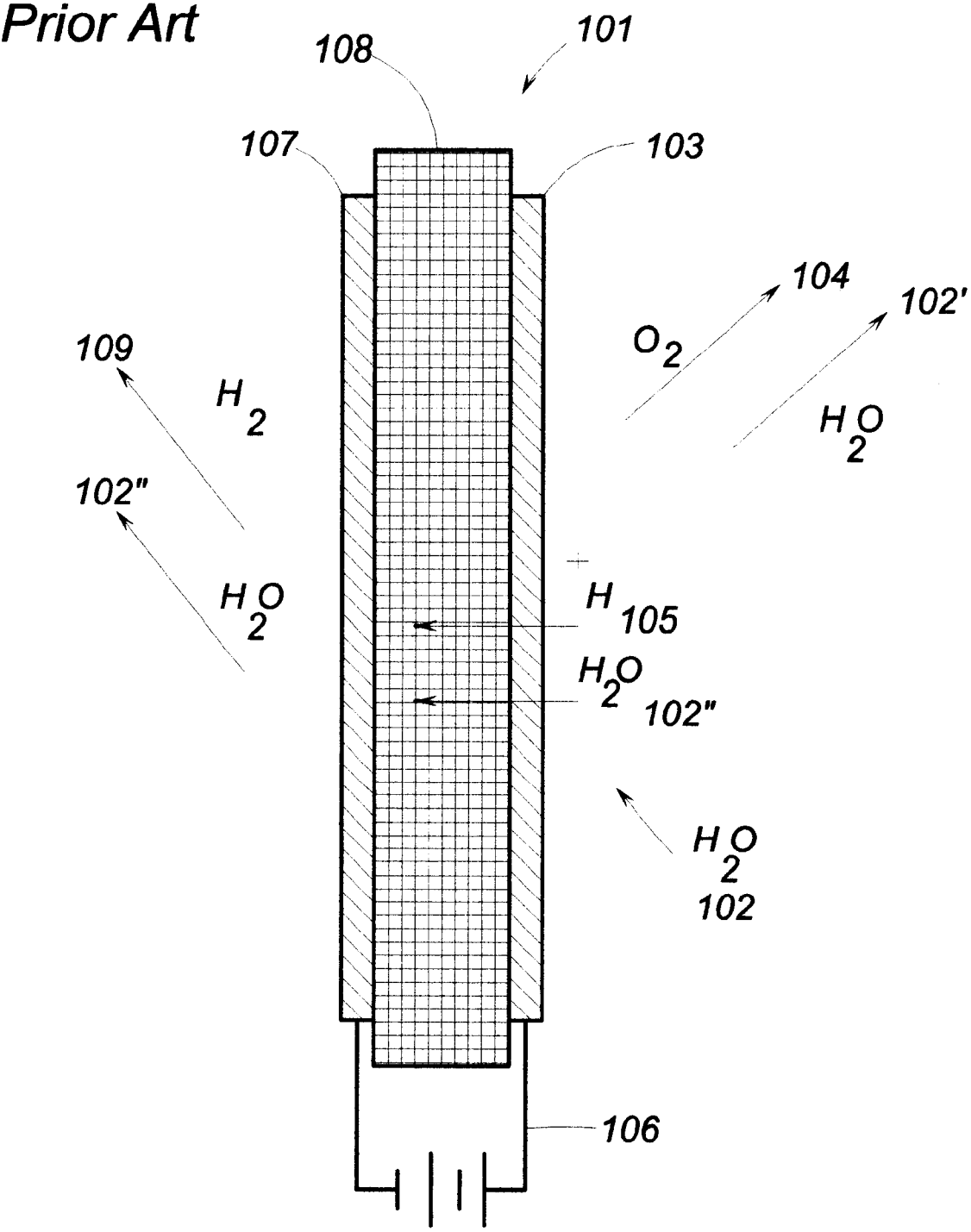
FIG. 1 is a schematic diagram of a prior art electrochemical cell showing an electrochemical reaction.

The present invention relates to an electrochemical cell frame having an integral membrane and membrane protector portion. An electrochemical cell stack in accordance with one embodiment of the present invention comprises a membrane 8 having an anode 3 and a cathode 7, which forms a membrane and electrode assembly. (See FIG. 2) The membrane 8 is disposed within cell frames 21,21' having integral protector portion 42. Oxygen screen pack 43 is installed inside of protector portion 42 of cell frame 21 between oxygen separator plate 45 and oxygen anode 3. Hydrogen screen pack 22 is installed inside of protector portion 42' of cell frame 21' between hydrogen separator plate 23 and hydrogen cathode 7. Gaskets 24, frames 21,21', membrane 8, and separator plates 23, 45 all include ports 25, which form separate conduits that provide fluid communication between the membrane and the gases.

The hydrogen screen pack 22, as well as the oxygen screen pack 43, can be any conventional screen capable of supporting the membrane, allowing the passage of hydrogen gas and water, and oxygen gas and water, respectively, and passing electrical current. Typically, the screens comprise one or more layers of etched or perforated sheets or a woven metal mesh, and are composed of material including steel, such as stainless steel, nickel, niobium, zirconium, cobalt, tantalum, titanium, among others and alloys thereof. The geometry of the openings in the screens often ranges from ovals, circles, and hexagons, to diamonds and other elongated shapes. An especially preferred screen assembly for use in electrochemical cells is disclosed in commonly assigned U.S. patent Ser. No. 09/102,305, to Trent Molter et al., now abandoned (herein incorporated by reference).

Figure 3:
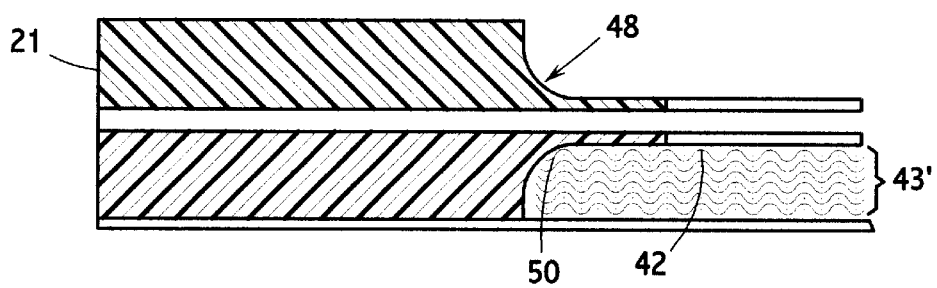
FIG. 3 is a cross sectional view of another embodiment of the cell frame of the present invention having an integral protector portion and a screen assembly with a crimped portion.

When employed with the integral protector portion, the screen assemblies may have a crimped or otherwise reduced thickness perimeter where the screen assembly will contact the extension of the protector portion (see FIG. 3). In FIG. 3, the cell frame 21 has a rounded (beveled, multisided, or the like) extension 48. The oxygen screen pack 43', which is located in intimate contact with the extension 48, has a crimped portion 50.

The screen assemblies 22, 43 support the membrane assembly wherein the cathode electrode and anode electrode are disposed in intimate contact with the membrane and the screen assemblies are disposed in intimate contact with the cathode and anode, accordingly. The membrane can be any conventional membrane. Typically, proton exchange membranes are employed, including, but not limited to, homogeneous perfluoroionomers such as Nafion® (commercially available from E.I. duPont de Nemours and Company, Wilmington, Del.), ionomer Teflon® composites such as Gore Select® (commercially available from W.L. Gore Associates, Inc., Elkton, Md.) and styrene membranes such as sulfonated styrene or styrene divinylbenzene, among others conventionally known in the art.

Similarly, the cathode and anode electrodes can be conventional electrodes composed of materials such as rhodium, carbon, gold, platinum, tantalum, tungsten, ruthenium, palladium, iridium, osmium, alloys thereof and other catalysts capable of electrolyzing water and producing hydrogen.

Figure 4:
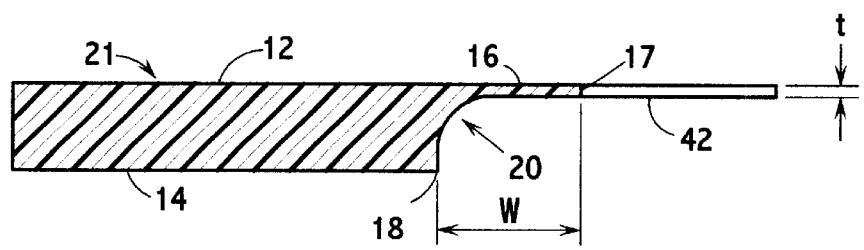
FIG. 4 is a cross sectional view of one embodiment of the cell frame of the present invention having an integral protector portion.
Figure 5:
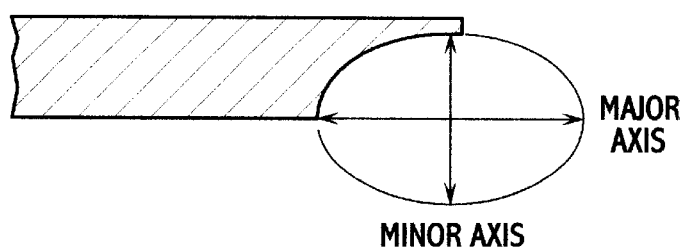
FIG. 5 is a cross sectional view of another embodiment of the cell frame of the present invention having an integral protector portion showing the elliptical fillet which can be employed in manufacturing the cell frame.

During operation, the cell 1 is stacked and held together under pressure, e.g. with tie rods or the like (not shown). In conventional cell frame designs, this pressure often causes the membrane to become pinched by the edge of the screen assemblies 22, 43. (See FIG. 2) The integral protector portion of the cell frame inhibits pinching or other damage to the membrane by the screen assemblies. As can be seen in FIG. 4, the protector portion 42 comprises a thin, elongated extension protruding from the membrane side 12 of the cell frame 21. This area should have a thickness ("t") sufficient to render sufficient structural integrity to prevent the edge of the screen assembly from pinching or cutting the membrane under the electrochemical cell operating conditions. The preferred thickness is dependent upon operating pressure and component tolerance allowances, with a thickness "t" up to about 0.008 inches or more common. For a cell having an average operating pressure of about 400 psi, and component tolerances of about 0.010, a thickness up to or exceeding about 0.008 inches can be employed, with about 0.002 inches to about 0.004 inches preferred, and about 0.003 inches to about 0.004 inches especially preferred.

The width "w" of the protector portion 42 should be sufficient to retain the screen assembly under electrochemical cell operating conditions without interfering with the active area of the membrane. As with the thickness, the width is dependent upon operating pressure and component tolerances, and is also dependent upon the active area size, with widths ("w") of up to and exceeding about 0.250 inches possible. For a cell having an average operating pressure of about 400 psi, component tolerances of about 0.010 inches, and an active area of about 1 square foot, a width of up to or exceeding about 0.175 inches can be employed, with a width of about 0.100 inches to about 0.160 inches preferred, and about 0.125 inches to about 0.150 inches especially preferred. It is understood that the above ranges are merely examples and that with different cell sizes and geometries, different thicknesses and widths may be preferred.

Figure 2:
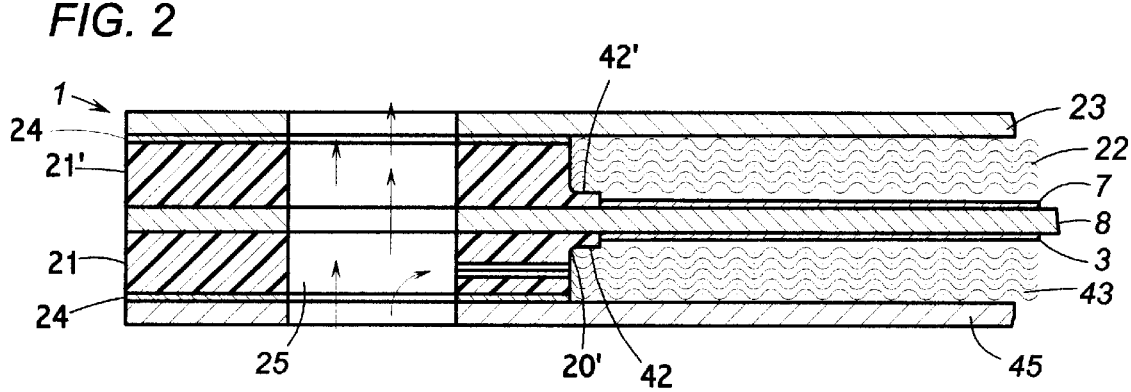
FIG. 2 is a cross sectional view of a partially assembled electrochemical cell stack taken substantially along a line through the center of an inlet port showing the relationship of the cell components.

Additionally, although the geometry of the area from point 18 of the cell frame to the lip 16 can be any geometry that provides the above described properties, for reasons of ease of manufacture and structural integrity of the lip 16, this area preferably comprises a curved portion 20 as is shown in FIG. 4. An alternative embodiment having a square portion 20' is shown in FIG. 2. In order to improve moldability of the protector lip by providing a wide-open flow path into the protector lip portion of the mold, the preferred radius of the curved portion is substantially equivalent to the frame thickness minus the thickness of the protector lip ("t"), with a radius between the frame thickness minus the thickness of the protector lip and the thickness of the protector lip especially preferred. Alternatively, for relatively large width lips (see FIG. 3A), an elliptical (conic) fillet may be employed.

Due to the compression effects of the various components of the electrochemical cell when assembled, the lip 16 of the protector portion 42 can be either flexible or rigid, and the screen assembly may have a recessed portion for receiving the lip. If a flexible lip 16 is employed, the pressures applied within the cell will typically cause the screen assembly 43, for example, to put pressure on the protector lip 16 and the membrane 8, thereby causing the protector lip to flex toward the membrane 8. When such an arrangement is employed, the end 17 of the lip 16 preferably comprises substantially rounded edges to prevent the lip 16 from puncturing, cutting, or otherwise damaging the membrane 8. The screen assembly 43' may optionally have a recessed portion within which the lip will be disposed (See FIG. 3).

When a rigid lip is employed, it is similarly preferred to avoid any sharp edges on the lip 16, and it is additionally preferred to crimp or otherwise form a recess in the edge of the screen assembly 43 that contacts the protector portion 42. This crimp should have a thickness substantially similar to or slightly less than the thickness "t" of the lip 16. During operation of the cell, the protector portion 42 essentially sits within the edge of the screen assembly 43 without being forced into the membrane 8.

The cell frame can be manufactured from elastomers, thermoplastic or thermosetting polymers, ceramics, metals, such as titantium and steels such as stainless steel, and other metals, and other materials, with polymers preferred, and neat or fiber-reinforced thermoplastic polymers especially preferred, including, but not limited to, polyetherimide, polysulfone, polyether sulfone, polyethylether ketone, and others. Typically these frames are produced using conventional methods such as machining, die casting, injection molding, forming, or another conventional technique.

The cell frame of the present invention having the integral protector lip has the following advantages over the prior art: fewer parts per cell assembly, simplified cell assembly, reducing the cost of the assembly, and rendering the assembly more reliable. A further advantage, particularly over prior art metallic protector rings, is that the present cell frame preferably comprises a non-conductive material, e.g. plastic or another non-conductive material. The prior art metallic protector rings could induce electrolysis outside of the cell active area, causing accelerated degradation of the cell, while the present integral protector lip inhibits electrolysis outside of the cell active area.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrochemical cell stack, comprising:
    a. a membrane disposed between an anode electrode and a cathode electrode to form a membrane assembly;
    b. at least two screen assemblies; and
    c. at least two cell frames, each cell frame having a membrane side and a screen assembly side, and an integral protector portion having an extension protruding from said membrane side of said frame;
        wherein said membrane assembly is disposed between said cell frames, in intimate contact with said membrane side of said cell frames, and one of said screen assemblies is disposed on each of said screen assembly sides of said cell frames, in intimate contact with both of said integral protector portion and said membrane assembly.

2. An electrochemical cell stack as in claim 1, wherein said extension has a thickness of up to about 0.008 inches.

3. An electrochemical cell stack as in claim 2, wherein said extension has a thickness of about 0.002 inches to about 0.004 inches.

4. An electrochemical cell stack as in claim 1, wherein said extension has a width of up to about 0.250 inches.

5. An electrochemical cell stack as in claim 4, wherein said extension has a width of up to about 0.175 inches.

6. An electrochemical cell stack as in claim 5, wherein said extension has a width of about 0.125 inches to about 0.150 inches.

7. An electrochemical cell stack as in claim 1, wherein said integral protector portion has a shaped portion on the screen assembly side of the cell frame in intimate contact with said cell frame, wherein said shaped portion is curved, square, or beveled.

8. An electrochemical cell stack as in claim 7, wherein said extension is flexible.

9. An electrochemical cell stack as in claim 1, wherein said integral protector portion has a substantially square portion on the screen assembly side of the cell frame in intimate contact with said cell frame, such that said extension has a substantially uniform thickness.

10. An electrochemical cell stack as in claim 1, wherein said extension is flexible.

\* \* \* \* \*